Feb. 8, 1927. Re. 16,545

A. E. ROBERT

CURTAIN SUPPORT

Original Filed Nov. 16, 1916

INVENTOR
Augusta E. Robert
BY
Arthur Phelps Marr
ATTORNEY

Reissued Feb. 8, 1927. Re. 16,545

UNITED STATES PATENT OFFICE.

AUGUSTA E. ROBERT, OF OAKLAND, CALIFORNIA.

CURTAIN SUPPORT.

Original No. 1,230,224, dated June 19, 1917, Serial No. 131,780, filed November 16, 1916. Application for reissue filed August 23, 1924. Serial No. 733,849.

This invention relates to a curtain rod and curtain holder intended to provide means for preventing the curtain from becoming dust laden through the opening of the window on which the curtain is used. It will be understood that wherever curtains are used they become badly soiled at top and bottom from the dust coming in through the open window every time the window is opened. With the present invention, the curtain may be raised or lowered as the case may be to prevent it from becoming soiled when the window is opened.

Other objects of the invention will appear as the description proceeds.

An embodiment of the invention is shown in the drawing in which the same reference numeral is applied to the same portion throughout, but I am aware that there may be many modifications thereof.

Figure 1:
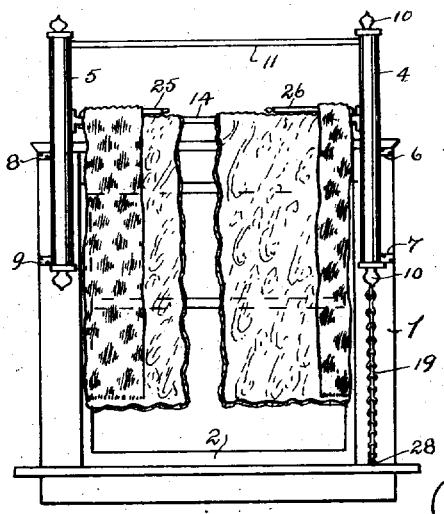
Figure 1 is a front elevation of a window equipped with this curtain holder.
Figure 2:
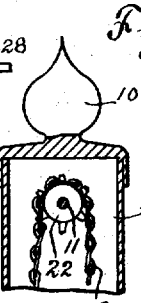
Fig. 2, is a sectional view of the curtain holder at the top of the same adjacent the shaft for raising and lowering the curtain rod.
Figure 3:
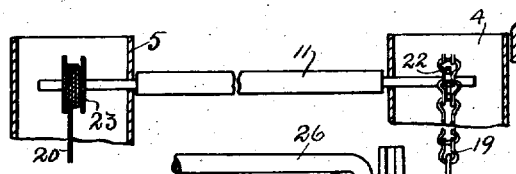
Fig. 3, is a broken view showing a vertical section of a portion of each of the tubes at the top of the curtain holder.
Figure 4:
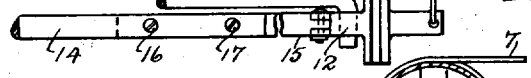
Fig. 4, is a front elevation of the curtain holding rods and slide for supporting them at one side of the curtain holder.
Figure 5:
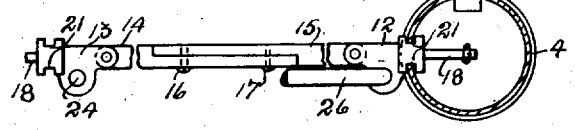
Fig. 5, is a plan view of the curtain holding rod, and a sectional view of a portion of one of the tubes showing the relation of the slide thereto, the curtain rod being broken in two places for the purpose of illustration.

The numeral 1 represents the window frame, 2 the lower sash, and 3 the upper sash. The curtain holder comprises two operating tubes 4 and 5 which are secured to the curtain frame by means of the brackets 6, 7 and 8, 9 respectively. The tubes 4 and 5 are provided with suitable ornaments 10 at the top and bottom, and they are connected by means of the shaft 11 and curtain rod, which is made up of the two slides 12, 13 and two pivoted rods 14, 15, which rods are pivoted to the slides 12 and 13. The rods are spliced at the center as indicated in Fig. 5, and are connected together by means of two small screws 16 and 17. Each of the slides 12 and 13 is provided with a projecting horn or lug, which extends within the tubes 4 and 5 respectively, which are to be connected one with a chain 19 and the other to be connected with a cord 20. The slides 12 and 13 are each grooved as indicated at 21 to move vertically in a groove in the tubes 4 and 5. The chain 19 passes over a sproket wheel 22 on one end of the shaft 11, and on the other end of the shaft 11 there is a pulley 23, said sprocket wheel and pulley being within the tubes 4 and 5 respectively. The cord 20 has one end connected to the pulley and said pulley is of such diameter with respect to the sprocket wheel 22 that as the chain is pulled down it will lift the left hand slide 13 at the same rate as the slide 12 is lifted, each of the slides 12 and 13 is provided with an opening as indicated at 24 to receive the oppositely extending drapery rod 25, 26, which are raised and lowered with the curtain rods 14, 15. The drapery holding rods may be turned outwardly to swing the draperies away from the window if desired, or may be swung in so that the draperies will hang close to the curtains.

The operation is as follows:—

Assuming the person in the room to wish the lower sash raised for the purpose of ventilation, the chain 19 will be pulled down until the lower end of the curtains are swung high to permit the air to pass into the room under the sash 2 without disturbing the curtains. In a similar way if the person desires to have the upper sash lowered, they will lower the curtains until the upper portion of the curtain is below the top of the upper sash when lowered, thereby preventing the dust from depositing in the curtains. A hook 28 enables the user to stop the curtain rod at any desired position.

Having thus described my invention, what I claim as new and desire to secure by Letters Patent of the United States, is as follows:—

1. In a window curtain holder the combination of a pair of slotted tubular members adapted to extend above the window; means for securing said members to the frame of said window; a shaft connecting said members above said window; a sprocket wheel located inside one of said members and secured to one end of said shaft; a pulley located inside the other of said members and secured to the other end of said shaft; a pair of slotted slide members movable up and down in the slots of said tubular members, each of which is provided with an extension; a sprocket chain passing over said sprocket wheel and secured to one of said extensions; a cord passing over said pulley and secured to the other of said extensions; a curtain rod joining said slide members; and means to secure said sprocket chain in any desired position to which it may be adjusted, substantially as described.

2. In a window curtain holder the combination of a pair of slotted tubular members; means for securing said members to the frame of a window; a shaft connecting said members at their upper end; a sprocket wheel located inside one of said members and secured to one end of said shaft; a pulley located inside the other of said members and secured to the other end of said shaft; a pair of slotted slide members movable up and down in the slots of said tubular members, and each provided with an extension; a sprocket chain passing over said sprocket wheel and secured to one of said extensions; a cord passing over said pulleys and secured to the other of said extension; a curtain rod joining said slide members; a pair of drapery holding rods pivotally supported from said slide members; and means to secure said sprocket chain in any desired position to which it maybe adjusted, substantially as described.

In testimony whereof, I have hereunto set my hand this 6th day of June, 1924.

AUGUSTA E. ROBERT.